(12) United States Patent
Segaert

(10) Patent No.: US 10,829,943 B2
(45) Date of Patent: Nov. 10, 2020

(54) FLOOR PANEL FOR FORMING A FLOOR COVERING, AND SUBSTRATE FOR A PANEL

(71) Applicant: UNILIN, BVBA, Wielsbeke (BE)

(72) Inventor: Martin Segaert, Ypres (BE)

(73) Assignee: UNILIN, BVBA, Wielsbeke (BE)

( * ) Notice: Subject to any disclaimer, the term of this patent is extended or adjusted under 35 U.S.C. 154(b) by 0 days.

(21) Appl. No.: 16/671,227

(22) Filed: Nov. 1, 2019

(65) Prior Publication Data

US 2020/0102757 A1   Apr. 2, 2020

Related U.S. Application Data

(63) Continuation of application No. 16/068,909, filed as application No. PCT/IB2017/050161 on Jan. 12, 2017, now Pat. No. 10,619,358.

(30) Foreign Application Priority Data

Jan. 15, 2016   (BE) .................................... 2016/5036

(51) Int. Cl.
*E04F 15/10* (2006.01)
*B32B 3/06* (2006.01)
(Continued)

(52) U.S. Cl.
CPC .............. *E04F 15/107* (2013.01); *B32B 3/06* (2013.01); *B32B 27/06* (2013.01); *B32B 27/20* (2013.01); *B32B 27/302* (2013.01); *B32B 27/32* (2013.01); *B32B 27/36* (2013.01); *E04F 15/02038* (2013.01); *E04F 15/102* (2013.01); *E04F 15/105* (2013.01); *B32B 2262/101* (2013.01); *B32B 2270/00* (2013.01); *B32B 2274/00* (2013.01); *B32B 2307/412* (2013.01);
(Continued)

(58) Field of Classification Search
CPC ...... E04F 15/102; E04F 15/105; E04F 15/107
See application file for complete search history.

(56) References Cited

U.S. PATENT DOCUMENTS 9,745,756 B2 * 8/2017 Hannig ................... E04F 15/02
2009/0133353 A1   5/2009 Pervan
(Continued)

FOREIGN PATENT DOCUMENTS

DE   10001148 A1   7/2001
EP    1026341 A2   8/2000
(Continued)

OTHER PUBLICATIONS

International Search Report and Written Opinion in related PCT/IB2017/050161, dated Apr. 20, 2017.

*Primary Examiner* — Paola Agudelo
(74) *Attorney, Agent, or Firm* — Bacon & Thomas, PLLC

(57) ABSTRACT

A floor panel for forming a floor covering, where the floor panel includes a layer-shaped substrate, as well as a decorative top layer situated above the substrate; and where the substrate includes at least a layer which is realized on the basis of a composition including at least a thermoplastic synthetic material; and the composition, apart from the thermoplastic synthetic material, also includes at least one or more elastomers; and that the thermoplastic synthetic material concerns thermoplastic polyester.

18 Claims, 1 Drawing Sheet

(51) Int. Cl.
*B32B 27/06* (2006.01)
*B32B 27/20* (2006.01)
*B32B 27/30* (2006.01)
*B32B 27/32* (2006.01)
*B32B 27/36* (2006.01)
*E04F 15/02* (2006.01)

(52) U.S. Cl.
CPC ..... *B32B 2307/414* (2013.01); *B32B 2419/04* (2013.01); *E04F 2201/0153* (2013.01); *E04F 2201/023* (2013.01); *E04F 2201/043* (2013.01)

(56) References Cited

U.S. PATENT DOCUMENTS

| | | |
|---|---|---|
| 2009/0274919 A1 | 11/2009 | Tian |
| 2011/0167744 A1* | 7/2011 | Whispell ................ E04F 15/02 52/309.1 |
| 2011/0301262 A1 | 12/2011 | Halahmi et al. |
| 2012/0103722 A1 | 5/2012 | Clausi |
| 2013/0104485 A1 | 5/2013 | Meersseman |
| 2013/0333821 A1* | 12/2013 | Hahn ........................ B32B 5/26 156/60 |
| 2014/0170359 A1* | 6/2014 | Schwitte ............... E04F 15/107 428/41.5 |
| 2014/0242342 A1 | 8/2014 | Vandevoorde |
| 2014/0283466 A1* | 9/2014 | Boo ...................... E04F 15/107 52/105 |
| 2015/0158241 A1 | 6/2015 | Dohring |
| 2015/0337540 A1 | 11/2015 | Cappelle |
| 2016/0340916 A1* | 11/2016 | Wright .................. E04F 15/107 |
| 2016/0369507 A1* | 12/2016 | Pervan ...................... E04C 2/26 |
| 2017/0106578 A1 | 4/2017 | Lombaert |
| 2017/0167145 A1 | 6/2017 | Naeyaert |
| 2017/0314273 A1 | 11/2017 | Hugi |
| 2017/0321435 A1 | 11/2017 | Chen |
| 2018/0016410 A1 | 1/2018 | Liu |
| 2018/0155934 A1 | 6/2018 | D'Hondt |
| 2018/0320388 A1* | 11/2018 | Lombaert ............... B32B 27/40 |

FOREIGN PATENT DOCUMENTS

| | | |
|---|---|---|
| WO | 9747834 A1 | 12/1997 |
| WO | 0144669 A2 | 6/2001 |
| WO | 0175247 A1 | 10/2001 |
| WO | 2006043893 A1 | 4/2006 |
| WO | 2008068245 A1 | 6/2008 |
| WO | 2009066153 A2 | 5/2009 |
| WO | 2009134403 A1 | 11/2009 |
| WO | 2011085306 A1 | 7/2011 |
| WO | 2013179260 A1 | 12/2013 |
| WO | 2013179261 A1 | 12/2013 |
| WO | 2014111192 A1 | 7/2014 |
| WO | 2014117887 A1 | 8/2014 |
| WO | 2015011049 A1 | 1/2015 |
| WO | 2016016864 A1 | 2/2016 |

* cited by examiner

FLOOR PANEL FOR FORMING A FLOOR COVERING, AND SUBSTRATE FOR A PANEL

The present invention relates to a floor panel for forming a floor covering, as well as to a substrate for a panel.

BACKGROUND OF THE INVENTION

More particularly, the invention relates to a floor panel for forming a floor covering of the type wherein the floor panel comprises a layer-shaped substrate, as well as a decorative top layer located above the substrate; and wherein the substrate comprises at least a layer which is realized on the basis of a composition comprising at least a thermoplastic synthetic material.

The term "layer-shaped substrate" indicates that the substrate is composed of one or more layers, more particularly material layers.

It is also noted that the decorative top layer does not necessarily have to adjoin directly to the substrate.

Such type of floor panel is known, amongst others, from the documents WO 01/44669, WO 2011/085306, WO 2013/179260, WO 2013/179261, WO 2014/117887 and WO 2015/011049.

From the herein above-mentioned documents, various synthetic materials are known, on the basis of which the substrate of the floor panel may be made. However, many of these synthetic materials, such as polyvinyl chloride (PVC), are criticized.

In fact, they possibly form a problem seen from an environmental point of view. For example, for the production of PVC plasticizers have to be used, such as plasticizers from the group of phthalates. Such plasticizers, however, are critically assessed in recent juridical regulations.

WO 2014/111192 discloses a substrate for floor panels, which forms an alternative for substrates made on the basis of PVC. The substrate is made on the basis of a thermoplastic matrix material and a cross-linked polymer in powder form which is embedded in the matrix material. The thermoplastic matrix material concerns a polyolefin, such as polypropylene (PP) or polyethylene (PE), or an olefin copolymer, such as ethylene-propylene-diene monomer (EPDM) rubber.

A disadvantage of such substrates based on PP or PE is that, under the influence of, for example, sunlight or underfloor heating, they can deform to such an extent that cracks or gaps can occur between such coupled together floor panels.

Moreover, the risk of such crack or gap formation is higher than with PVC-based substrates.

Another disadvantage is that with such substrates based on PP or PE, it is relatively difficult to produce a solid and at the same time mechanically strong floor panel in respect to, for example, PVC-based substrates.

Said WO '049 mentions, amongst others, polyethylene terephthalate, abbreviated PET, as a synthetic material which can be applied for manufacturing the substrate of the floor panel.

A disadvantage of such PET-based substrate is that the fatigue in the substrate under the influence of load can be considerable. This is primarily disadvantageous in the case that coupling parts, such as snap profiles, are manufactured from the material of the substrate. In fact, the fatigue may lead to damage or breaking of these coupling parts.

Another disadvantage is that such PET-based substrate may be rather brittle.

Another disadvantage is that with such PET-based substrate there is a relatively high risk of crack or gap formation between the coupled floor panels due to deformation under the influence of, for example, sunlight or underfloor heating.

SUMMARY OF THE INVENTION

The present invention primarily aims at an alternative floor panel of the aforementioned type, wherein according to various preferred embodiments solutions are offered for problems with floor panels of the state of the art.

To this aim, the invention relates to a floor panel for forming a floor covering of the aforementioned type, with the characteristic that the composition, apart from the thermoplastic synthetic material, also comprises at least one or more elastomers; and that said thermoplastic synthetic material concerns thermoplastic polyester.

An advantage of such composition is that the respective substrate layer can be made very strong. Thus, it offers the possibility of realizing a strong floor panel substrate, from which coupling parts, such as snap profiles, can be manufactured which allow providing a strong and stable locking among the floor panels.

Moreover, the inventor has found that the composition does not only allow realizing the respective substrate layer very strong, but also allows reducing the fatigue under the influence of load. This is because the composition can provide the respective substrate layer with the elasticity required to this aim. Certainly in the case that coupling parts, such as snap profiles, are provided in the substrate layer, this is advantageous, in view of the fact that the risk of breaking or damage thereof can be minimized.

It has also been found that the composition allows realizing a particularly robust and tough substrate layer. In fact, the composition seems to be able to compensate the sensitivity of thermoplastic polymer for hydrolysis, as well as to be able to reduce the viscosity reduction associated therewith, as a result of which a less brittle substrate layer is obtained.

One or more of the herein above-mentioned advantages are particularly well perceivable when the amount of thermoplastic polyester in the composition is between 5 wt % and 50 wt %. More preferably, this amount is between 10 wt % and 40 wt %, and still more preferably between 15 wt % and 35 wt %.

The thermoplastic polyester can be selected from the group comprising the following materials: polyethylene terephthalate (PET), polybutylene terephthalate (PBT), polytrimethylene terephthalate (PTT), also known as polypropylene terephthalate (PTT), polyethylene naphthalate (PEN) and combinations thereof.

Preferably, the thermoplastic polyester concerns PET, considering that the herein above-mentioned advantages can be shown particularly well when applying PET.

Apart therefrom, PET also offers ecological advantages, considering that it allows applying recycled PET in the herein above-mentioned composition. This recycled PET then can originate from, for example, PET bottles or from PET-containing floor covering products, such as PET-containing carpet or PET-containing floor panels according to the present invention.

In particular, the thermoplastic polymer can be present in the composition in the form of PET flakes, such as colored PET flakes.

One or more of the herein above-mentioned advantages are particularly prominent when the amount of elastomer in the composition is situated between 1 wt % and 35 wt %.

Preferably, this amount is situated between 1 wt % and 30 wt %, more preferably between 5 wt % and 30 wt %, and still more preferably between 5 wt % and 25 wt %.

At least one elastomer can be selected from the group of elastomers having a Shore hardness which is higher than 20 Shore A and lower than 90 Shore A, or still better from the group of elastomers having a Shore hardness higher than 40 Shore A and lower than 85 Shore D. Herein, the Shore hardness is measured according to the ISO 868 standard. In particular, the one or more elastomers all are selected from the herein above-mentioned groups.

Preferably, at least one elastomer concerns a thermoplastic elastomer. In the case that the composition comprises a plurality of elastomers, those preferably are all of the thermoplastic type.

The thermoplastic elastomer can be realized according to any of the following possibilities.

According to a first possibility, the thermoplastic elastomer is realized on the basis of propylene. In a first preferred embodiment according to this first possibility, this concerns an ethylene-propylene copolymer, wherein the propylene in particular concerns isotactic propylene. So, the elastomer, for example, can be composed substantially of repeat units of isotactic propylene with random distribution of ethylene. Examples of such ethylene-propylene copolymers are the commercially available Vistamaxx propylene-based elastomers of ExxonMobil, with Vistamaxx 3020 FL and Vistamaxx 6202FL being preferred. In a second preferred embodiment according to the aforementioned first possibility, the elastomer realized on the basis of propylene concerns a thermoplastic polyolefin (TPE-O or TPO) or a composition of PP and non-cross-linked EPDM rubber. An example of such thermoplastic polyolefin is Q 100 F from LyondellBasell.

According to a second possibility, the thermoplastic elastomer is realized on the basis of a styrene block copolymer, such as styrene-butylene-styrene (SBS) or styrene-ethylene-butylene-styrene (SEBS). In a first preferred embodiment according to this second possibility, this concerns a block copolymer based on styrene and ethylene/butylene or styrene and ethylene/propylene. Examples hereof are the commercially available Kraton G elastomers. In particular, this concerns a linear tri-block copolymer based on styrene and ethylene/butylene or linear SEBS, with the Kraton G1645 M elastomer being preferred. In a second preferred embodiment according to said second possibility, the elastomer realized on the basis of a styrene block copolymer is realized on the basis of a composition of, on the one hand, SEBS or SBS and, on the other hand, a polyolefin, such as PP or PE. Examples hereof concern the commercially available Ensoft-S elastomers, with Ensoft-S SM-300-40A and Ensoft SX-241-50A-T2-000 being preferred. The Kraton G synthetic materials can also be applied in this second preferred embodiment, with the Kraton G1645 M being preferred.

According to a third possibility, the thermoplastic elastomer concerns a so-called polyolefin elastomer (POE). Such elastomer is based on an ethylene-α-olefin copolymer, such as an ethylene-octene or an ethylene-butene copolymer. Examples of such elastomers are the commercially available Engage elastomers from The Dow Chemical Company, with Engage 8180 and Engage 8402 being preferred. Still another example is Queo 0203 from Borealis.

Each of the herein above-described embodiment possibilities for the thermoplastic elastomer is particularly advantageous in view of the fact that the described types of elastomers can be processed very easily together with a thermoplastic polyester, such as PET, to the respective substrate layer of the floor panel.

In the case that the composition comprises a plurality of elastomers, each of these elastomers preferably are realized according to any of the herein above-described possibilities, wherein a plurality of the embodiment possibilities can be combined.

There are still other embodiment possibilities for the thermoplastic elastomer which can be applied. So, the elastomer may relate, for example, to a thermoplastic vulcanisate (TPV or TPE-V), such as a TPV based on PP and EPDM. According to still another possibility, the elastomer concerns a thermoplastic polyether block amide (PEBA). Examples of such PEBA elastomer are the commercially available Pebax elastomers. According to still another alternative, the elastomer is a thermoplastic copolyester (COPE), of which the commercially available Ecdel elastomers from Eastman form an example. Another alternative for the elastomer is a thermoplastic urethane (TPU), such as the commercially available Estollan from BASF.

According to an alternative, at least one of the elastomers can concern polychloroprene or neoprene.

Although the invention does not exclude that at least one of the elastomers is of the thermo-hardening type, this option is not preferred due to the difficult processability of such elastomers and their negative influence on the recyclability.

Preferably, at least one of the elastomers is free from maleic anhydride or is not grafted with maleic anhydride. In case that the composition comprises a plurality of elastomers, those preferably all are free from maleic anhydride or are not grafted with maleic anhydride.

Further, the composition also can at least be provided with mineral fiber structures, such as fibers of glass, talc and/or wollastonite. These mineral fiber structures provide for that the extent of deformation occurring under the influence of varying temperature by, for example, incident sunlight or underfloor heating, can be restricted. In this manner, the associated therewith risk of crack or gap formation between the coupled floor panels can be reduced. In other words, the mineral fiber structures increase the dimensional stability of the respective substrate layer and reduce the thermal shrinkage or expansion with changing temperatures. Moreover, the one or more elastomers seem to enhance the positive influence of the mineral fiber structures on the dimensional stability. Together with the thermoplastic polyester, they form a flexible matrix in which the fibers structures seem to thrive well. It has also been found that the composition of the fiber structures can be provided without the respective substrate layer thereby becoming too rigid or too hard. This is remarkable in view of the already relatively high rigidity or hardness of a thermoplastic polyester, such as PET.

The amount of mineral fiber structures in the composition preferably is situated between 5 wt % and 40 wt %, more preferably between 10 wt % and 30 wt %, and still more preferably between 15 wt % and 25 wt %.

At least a filler may be added to the composition, such as chalk, limestone and/or talc. Such filler, on the one hand, allows modifying the mechanical properties of the substrate, and, on the other hand, it can imply economic advantages. It has also been found that the filler can be added to the composition without the respective substrate layer hereby becoming too rigid or too hard. This is remarkable in view of the already relatively high rigidity or hardness of a thermoplastic polyester, such as PET.

The amount of filler in the composition preferably is situated between 10 wt % and 80 wt %, more preferably between 20 wt % and 70 wt %, and still more preferably between 20 wt % and 60 wt %. In an embodiment, the amount of filler in the composition may be situated between 55 wt % and 70 wt %.

Although the composition preferably is free from plasticizers, the present invention does not exclude the application thereof. In any case, the present invention allows reducing the plasticizer content to a minimum. Examples of plasticizers which possibly may be applied are DOP, DINCH, DINP, DOTP or polyisobutenes, such as Oppanol B.

The composition preferably also comprises at least a compatibilizer or coupling agent. The compatibilizer or coupling agent offers the advantage that the stability of the composition can be increased. This is in particular the case when the thermoplastic polyester does show no or little affinity for one of the one or more elastomers. In this context, it is noted that elastomers performed according to the herein above-described first preferred embodiment of the second embodiment possibility, to wit block copolymers based on styrene and ethylene/butylene or styrene and ethylene/propylene, such as linear tri-block copolymers based on styrene and ethylene/butylene, may show such affinity. For example, the herein above-mentioned Kraton elastomers already may show affinity with the thermoplastic polyester, which in particular concerns PET. In that case, no compatibilizer has to be applied, however, this is not excluded.

It is also noted that in the case that the composition comprises a plurality of elastomers, a plurality of compatibilizers or coupling agents may be applied. The number of compatibilizers applied herein may depend on the number of elastomers which already show an affinity for the thermoplastic polyester.

A suitable compatibilizer or coupling agent may be based on glycidyl methacrylate.

An example thereof is a copolymer of ethylene and glycidyl methacrylate, such as the commercially available Lotader AX 8840. Another example thereof is a terpolymer of ethylene, acryl ester and glycidyl methacrylate, such as the commercially available Lotader AX 8900.

Still another example of a suitable compatibilizer or coupling agent is an ethylene terpolymer, whether or not in combination with glycidyl methacrylate, such as the commercially available Elvaloy PTW from Dupont.

Another suitable compatibilizer can be formed by PP which is crafted with maleic anhydride. The commercially available Orevac CA100, Polybond 3200, Polyram Bondyram 1001 and 1101 form examples thereof.

The amount of compatibilizer or coupling agent in the composition preferably is smaller than 10 wt %, more preferably smaller than 5 wt % and still more preferably smaller than 2.5 wt %.

The composition may also comprise at least so-called melt enhancers, the amount of which in the composition preferably is smaller than 5 wt %, more preferably smaller than 2.5 wt % and still more preferably smaller than 1 wt %. The melt enhancers contribute to the robustness and toughness of the respective substrate layer. In fact, they reduce the viscosity reduction of the thermoplastic polyester which can be effected by hydrolysis thereof.

Apart from the components or constituents already mentioned herein above, the composition may also comprise at least a thermoplastic synthetic material other than a thermoplastic polyester. That the composition comprises a further thermoplastic synthetic material other than thermoplastic polyester, herein denominated "additional thermoplastic synthetic material", has the advantage that an additional freedom is created for modifying the properties of the substrate layer.

The additional thermoplastic synthetic material preferably concerns PP. This offers the advantage that the rigidity of the respective substrate layer still can be reduced, by which the extent of fatigue under the influence of load can be restricted. Certainly in the case that coupling parts, such as snap profiles, are provided in the substrate layer, this is advantageous, considering that the risk of breaking or damage thereof still can be minimized. Moreover, by employing PP as an additional thermoplastic synthetic material, the robustness and toughness of the respective substrate layer can be increased even further.

Although preferably isotactic polypropylene is applied as an additional thermoplastic synthetic material, the invention does not exclude the use of atactic polypropylene.

In fact, the use of atactic polypropylene may contribute to that a higher amount of filler can be achieved.

In still another possibility, the additional thermoplastic synthetic material concerns polystyrene or a combination of PP and polystyrene.

It is also noted that the most advantageous values for at least the amount of thermoplastic polyester, elastomer and possibly present filler in the composition depend on the type of elastomer which is applied, as described herein below.

In the herein above-described first embodiment possibility for the elastomer, the composition preferably fulfills one or more of the following characteristics:
  the amount of thermoplastic polyester in the composition is situated between 20 wt % and 30 wt %;
  the amount of elastomer in the composition is situated between 5 wt % and 15 wt %; and/or
  the amount of filler in the composition is situated between 40 wt % and 50 wt %.

In the herein above-described second embodiment possibility for the elastomer, the composition preferably fulfills one or more of the following characteristics:
  the amount of thermoplastic polyester in the composition is situated between 15 wt % and 25 wt %;
  the amount of elastomer in the composition is situated between 5 wt % and 15 wt %; and/or
  the amount of filler in the composition is situated between 45 wt % and 55 wt %.

In the herein above-described third embodiment possibility for the elastomer, the composition preferably fulfills one or more of the following characteristics:
  the amount of thermoplastic polyester in the composition is situated between 25 wt % and 35 wt %;
  the amount of elastomer in the composition is situated between 15 wt % and 25 wt %; and/or
  the amount of filler in the composition is situated between 25 wt % and 35 wt %.

The respective substrate layer can also be foamed. The advantage thereof is that the density of the substrate layer can be reduced. In this manner, it is possible to realize savings on raw materials and energy. Also, the substrate layer may be allocated new properties, such as in the field of comfort and dimensional stability.

To this aim, the composition may comprise a blowing agent. According to a first possibility, the blowing agent may relate to a chemical blowing agent, such as azoisobutyronitrile or azodicarbonamide. In a second possibility, the blowing agent is an expandable microsphere. Examples of such expandable microspheres are the commercially available Expancel expandable microspheres. According to a third possibility, the blowing agent concerns a physical blowing agent.

It is also noted that a plurality of the herein above-described blowing agents can be combined.

In order to reduce the density of the substrate layer or on behalf of economic advantages, the composition may also comprise at least a density-reducing filler, such as perlite, vermiculite and/or silicate. The filler in particular concerns an expanded, foamed, porous or hollow filler. In the case of such expanded filler, here a filler is intended which is already expanded before being added to the composition. In particular, the expanded filler concerns an already expanded microsphere, such as the commercially available, already expanded Expancel microspheres.

The layer-shaped substrate may be provided with a reinforcement layer, such as a glass fiber cloth or a glass fleece, whether or not being situated in the respective substrate layer. The reinforcement layer can increase the dimensional stability of the floor panel and in this manner reduce the thermal shrinkage or expansion with changing temperatures, which limits the risk of crack and gap formation in coupled floor panels.

The thickness of the floor panel preferably is formed substantially, thus, half or more, by the layer-shaped substrate. More particularly, the layer-shaped substrate forms a carrier for the decorative top layer situated there above.

The thickness of the layer-shaped substrate preferably is situated between 1 and 6 mm and more preferably between 2 and 5 mm. This allows realizing the floor panel sufficiently thin, whereas it still has sufficient strength and stability.

It is also noted that the respective substrate layer can be manufactured according to various possibilities. So, the substrate layer may be manufactured by means of strewing, extrusion, injection molding, calendering and/or coating techniques.

The layer-shaped substrate can be composed of a plurality of layers. In that case, at least one of the layers is realized on the basis of the herein above-described composition. The one or more remaining layers may be realized on the basis of a composition as described herein above, which, however, does not have to be identical to the composition of the at least one layer. However, it is possible that the one or more remaining layers are realized otherwise and not on the basis of a composition as described herein above.

The top layer comprises at least a decor, as well as a transparent or translucent wear layer situated above the decor.

The decor of the top layer preferably comprises a motif or pattern, which, in the form of a print, is provided on a carrier sheet. The decor may show, for example, a wood motif or pattern, a stone motif, a ceramic motif or the like. The carrier sheet may relate to a paper sheet impregnated in resin or a synthetic material film. An example of a resin-impregnated paper sheet is a melamine-impregnated paper sheet.

Examples of synthetic material films are polyvinyl chloride films, polyurethane films, polypropylene films, polyethylene terephthalate films and polyethylene films. Such printed carrier sheet preferably is bonded to the substrate or a remaining layer of the top layer by means of a thermal laminating process. The printed carrier sheet may be bonded to the substrate, whether or not together with one or more remaining layers of the top layer.

According to an alternative, however, also preferred embodiment the decor concerns a so-called "direct print" or "Direktdruck". Herein, the decor is provided directly on an underlying layer of the floor panel or on a base coat or primer provided on this underlying layer. The underlying layer may concern the substrate, but also another layer of the top layer. In such direct print, a printer may be applied which preferably concerns a digital printer, such as a digital inkjet printer.

According to another alternative, the decor concerns a print provided on the underside of the wear layer.

According to a first possibility, the wear layer concerns a paper sheet soaked in resin. An example of such paper sheet is a melamine-impregnated paper sheet. The paper sheet preferably is provided with hard particles, such as corundum particles.

Such particles increase the wear resistance of the floor panel. The paper sheet soaked in resin, whether or not together with the above-mentioned printed paper sheet, can be provided on the substrate or another layer of the top layer, for example, by means of a thermal laminating process.

According to a second possibility, the wear layer concerns a synthetic material-based wear layer, which either is applied as a film, whether or not together with the above-mentioned printed film, for example, by means of a thermal laminating process, or is applied in liquid form and subsequently is cured on the substrate or another layer of the top layer. In case that the wear layer comprises a film, this preferably concerns a thermoplastic film, in particular a polyvinyl chloride film, a polyurethane film, a polypropylene film, a polyethylene terephthalate film or a polyethylene film.

The top layer may comprise a back layer, which comprises at least a thermoplastic synthetic material. The back layer, whether or not together with the herein above-mentioned printed carrier sheet and/or the wear layer, can be bonded to the substrate under the influence of pressure and temperature, either applied in liquid or paste-like form by calendering it or providing it on the substrate in another manner.

The back layer preferably is performed on the basis of a supple thermoplastic. Such supple back layer has the advantage that the flexibility of the floor panels can be increased. Such flexibility may contribute to the ease of installation of the floor panels, as well as, for example, to a reduction of the noise production, for example, when the floor panels are walked upon.

The top layer can be finished with a lacquer layer, which is applied as a liquid layer on said wear layer and/or the aforementioned decor and subsequently is hardened.

Preferably, this concerns a lacquer layer which can be hardened by UV light or excimer radiation, or a layer which can be hardened by means of a temperature increase. This last-mentioned layer may make use, for example, of blocked isocyanates as a cross-linker. Preferably, a lacquer layer is applied on top of the possible wear layer, however, according to an alternative, the lacquer layer may function as a wear layer.

The top layer may also be provided with embossments, whether or not realized in register with the decor. For this purpose, a roller can be applied, such as described as such in PCT/IB2015/055826. The embossments provide the floor panels with a relief, such that they can simulate a natural structure, such as a wood structure, even better. The embossments may be realized, for example, according to a wood nerve pattern.

Apart from the substrate and the top layer, the floor panel may also comprise a counter layer, which is situated underneath the substrate, however, does not necessarily have to adjoin thereto. The counter layer may be performed, for example, on the basis of cork or on the basis of a thermoplastic synthetic material, which preferably is supple. Such rather supple counter layer may impart new properties to the floor panel, for example, in the field of comfort and sound absorption. In particular, such counter layer forms a layer with acoustic properties. The counter layer may contribute, for example, to the reduction of the noise production of the floor panel, for example, when the floor panel is being walked upon.

On at least two opposite edges, the floor panel preferably is provided with mechanical coupling means or coupling parts which allow coupling two of such floor panels to each other. Herein, the coupling means or coupling parts can effect a locking in a direction perpendicular to the plane of the coupled floor panels or in a direction perpendicular to the coupled edges and in the plane of the coupled floor panels. Preferably, the coupling means or coupling parts effect a locking in both aforementioned directions.

Preferably, the coupling means or coupling parts show one or a combination of the following characteristics:
- the characteristic that the mechanical coupling means or coupling parts substantially are realized as a tongue and a groove bordered by an upper lip and a lower lip, wherein this tongue and groove substantially are responsible for the locking in said direction perpendicular to the plane of the coupled floor panels, and wherein the tongue and the groove are provided with additional locking parts, substantially responsible for the locking in said direction perpendicular to the coupled edges and in the plane of the coupled floor panels. Preferably, the locking parts comprise a protrusion on the lower side of the tongue and a recess in the lower lip of the groove. Such coupling means and locking parts are known, for example, from WO 97/47834;
- the characteristic that the mechanical coupling means or coupling parts press the coupled floor panels towards each other, for example, in that these mechanical coupling means are realized with a so-called pretension, as known as such from EP 1 026 341. The tension force with which the floor panels are pressed against each other or towards each other may be obtained, for example, in combination with the above-mentioned feature, by means of a lower lip which is bent out in coupled position, which, in trying to move back resiliently, presses against the lower side of the tongue;
- the characteristic that the mechanical coupling means or coupling parts allow a coupling by means of a horizontal, or quasi-horizontal, shifting movement of the panels towards each other;
- the characteristic that the mechanical coupling means or coupling parts allow a coupling by means of a turning movement along the respective edges;
- the characteristic that the mechanical coupling means or coupling parts allow a coupling by means of a downward-directed movement of a male coupling part, for example, with a tongue, into a female coupling part, for example, with a groove, preferably in order to install such floor panels according to the so-called "fold-down" principle, as is known as such from WO 01/75247;
- the characteristic that the mechanical coupling means or coupling parts, or at least the pertaining upper edge, are realized by means of a milling treatment with rotating milling tools; and/or
- the characteristic that the mechanical coupling means or coupling parts make use of a separate locking element or an insert, as described as such in, amongst others, the documents WO 2006/043893 A1, WO 2008/068245 A1 and WO 2009/066153 A2.

Preferably, said coupling means or coupling parts, or at least a portion of these coupling means or coupling parts, are provided in the material of the substrate, more particularly in the material of the substrate layer realized on the basis of the herein above-described composition. The substrate layer has excellent properties for this purpose, such as in the field of mechanical strength and flexibility. The coupling means or coupling parts can be applied by means of milling treatments with rotating milling tools.

The floor panel preferably concerns an oblong rectangular or a square floor panel, which on both of its pairs of opposite edges is provided with coupling means or coupling parts, such as described herein above.

However, it is not excluded that the floor panel is free from coupling means or coupling parts at its edges, wherein the floor panel then is intended for being glued with its underside against an underlying surface or for being installed loosely.

It is also noted that the present invention also concerns a substrate for a panel, more particularly a floor panel, wherein the substrate is layer-shaped and comprises at least a layer which is realized on the basis of a composition comprising at least a thermoplastic synthetic material, with the characteristic that the composition, apart from the thermoplastic synthetic material, also comprises at least one or more elastomers; and that said thermoplastic synthetic material concerns thermoplastic polyester. The substrate and the composition further can be implemented as already described herein above.

Further, it is also noted that each of the herein above-mentioned value intervals comprises the mentioned borders unless stated otherwise.

BRIEF DESCRIPTION OF THE DRAWINGS

With the intention of better showing the characteristics of the invention, herein, as an example without any limitative character, some preferred embodiments are described, with reference to the accompanying drawings, wherein.

DETAILED DESCRIPTION OF THE INVENTION

Figure 1:
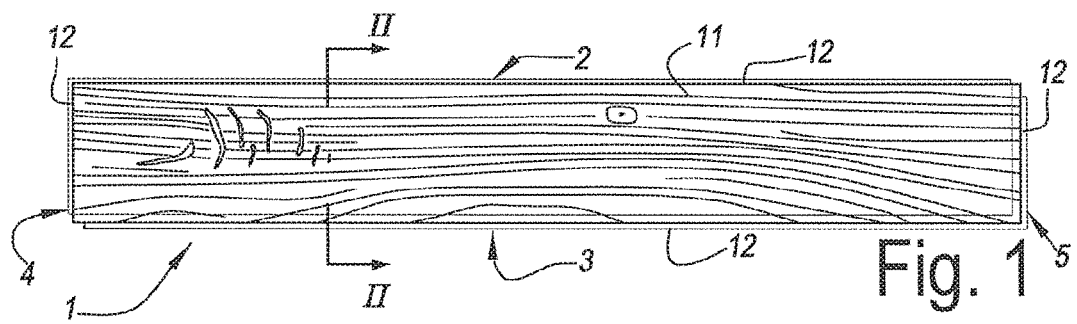
FIG. 1 in top view represents a floor panel according to the invention.

FIG. 1 in top view represents a floor panel 1 according to the present invention. The floor panel 1 here is oblong and rectangular. It comprises a pair of long sides 2-3 and a pair of short sides 4-5.

Figure 2:
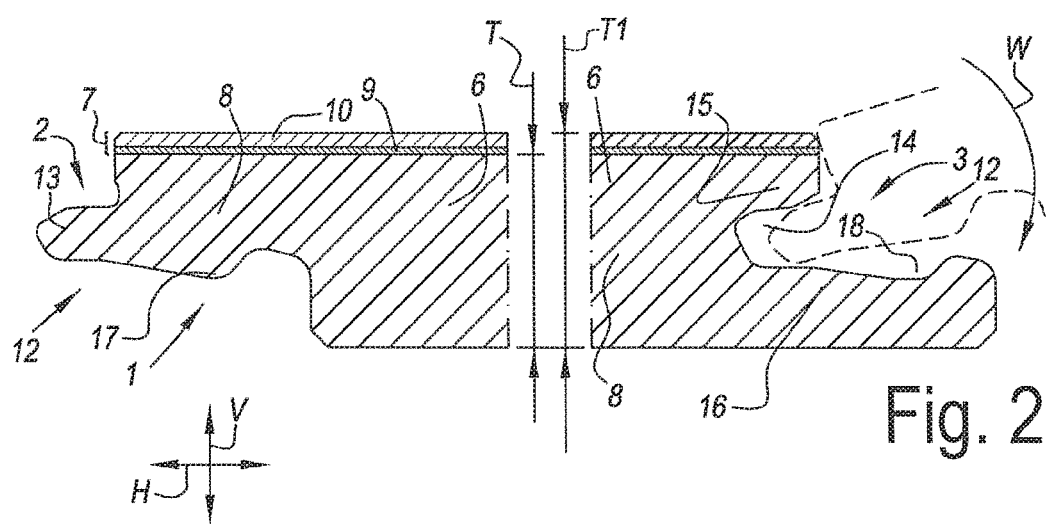
FIG. 2 represents a cross-section according to line II-II in FIG. 1.

FIG. 2 represents a cross-section according to line II-II in FIG. 1. From the cross-section, it is clear that the floor panel 1 is composed of a layer-shaped substrate 6 and a decorative top layer 7 situated above the substrate 6.

In the example, the substrate 6 comprises a single layer 8 which is realized on the basis of a composition as described herein above. Here, the composition more particularly comprises PET, a thermoplastic elastomer, a compatibilizer or coupling agent, glass fibers, calcium carbonate and melt enhancers. Three practical examples of such composition will be described below.

Example 1

The PET is present in the form of PET flakes, the amount of which in the composition is 25 wt %. The elastomer is realized according to the herein above-described first embodiment possibility. It is thus a thermoplastic elastomer made on the basis of propylene and more particularly concerns an ethylene-propylene copolymer, to wit Vistamaxx 6202FL. This elastomer is present in an amount of 8 wt %. The compatibilizer or coupling agent concerns a terpolymer of ethylene, acryl ester and glycidyl methacrylate, to wit Lotader AX8900, which is present in the composition in an amount of 1.8 wt %. Further, the glass fibers, the calcium carbonate and the melt enhancers are present in an amount of 20 wt %, 45 wt % and 0.2 wt %, respectively.

Example 2

The PET is present in the composition in an amount of 20 wt %. The elastomer is realized according to the herein above-described second embodiment possibility. Thus, this concerns a thermoplastic elastomer on the basis of a styrene block copolymer and more particularly realized on the basis of a composition of a SEBS block copolymer and a polyolefin, such as PP, to wit Ensoft SX-241-50A-T2-000. This elastomer is present in an amount of 8 wt %. The compatibilizer concerns a copolymer of ethylene and glycidyl methacrylate, to wit Lotader AX8840, which is present in the composition in an amount of 1.8 wt %. Further, the glass fibers, the calcium carbonate and the melt enhancers are present in an amount of 20 wt %, 50 wt % and 0.2 wt %, respectively.

Example 3

The PET is present in the composition in an amount of 30 wt %. The elastomer is realized according to the herein above-described third embodiment possibility and thus concerns a polyolefin elastomer. More particularly, it is an ethylene-octene copolymer, to wit Engage 8180. This elastomer is present in an amount of 18 wt %. The compatibilizer concerns Sukano TA52-10 MB02, which is present in the composition in an amount of 1.8 wt %. Further, the glass fibers, the calcium carbonate and the melt enhancers are present in an amount of 20 wt %, 30 wt % and 0.2 wt %, respectively.

Here, the substrate 6 has a thickness T forming more than half of the overall thickness T1 of the floor panel 1.

In the example, the decorative top layer 7 comprises a decor 9, as well as a transparent or translucent wear layer 10 situated above the decor 9. Herein, the decor 9 and the wear layer 10 can be realized as described herein above. As schematically represented in FIG. 1, the decor comprises a wood motif 11.

It is also noted that here the decorative top layer 7 for clarity*s sake is represented larger than in reality.

Here, the floor panel 1 is provided with mechanical coupling parts 12 on at least the sides 2-3. The coupling parts 12 allow that two of such floor panels 1 can be coupled to each other in such a manner that a locking is created in a direction V perpendicular to the plane of the coupled floor panels 1 as well as in a direction H perpendicular to the coupled sides 2-3 and in the plane of the coupled floor panels 1.

The shown coupling parts 12 substantially are realized as a tongue 13 and a groove 14, which are responsible for the locking in the direction V. Herein, the groove 14 is provided with an upper lip 15 and a lower lip 16 which extends beyond the distal end of the upper lip 15.

The tongue 13 and the groove 14 are also provided with locking parts 17-18, which are responsible for the locking in the direction H. In the example, the locking parts 17-18 consist of a protrusion 17 on the lower side of the tongue 13 and, cooperating therewith in the coupled condition, a recess 18 in the lower lip 16 of the groove 14.

In the represented example, the coupling parts 11-12 substantially are realized in the substrate layer 8. This can be by means of milling treatments, for example, with rotating milling tools.

The contour, represented in dotted line, of the side 2 shows that the coupling parts 12 in the example allow at least a coupling by means of a turning movement W along the sides 2-3 concerned.

The present invention is in no way limited to the herein above-described embodiments, on the contrary may such floor panels and substrates be realized according to various variants, without leaving the scope of the present invention.

The invention claimed is:

1. A floor panel for forming a floor covering, wherein the floor panel comprises:
a layer-shaped substrate,
a decorative top layer situated above the substrate; and
wherein the substrate comprises at least a layer which is realized on the basis of a composition comprising at least a thermoplastic synthetic material and at least one or more elastomers;
wherein said thermoplastic synthetic material is a thermoplastic polyester; and
wherein the at least one of the elastomers is realized on the basis of propylene; and
wherein the elastomer realized on the basis of propylene has at least one of the following characteristics:
is an ethylene-propylene copolymer; or
is a thermoplastic olefin (TPO) or a composition of polypropylene and not-cross-linked ethylene-propylene-diene monomer (EPDM) rubber,
wherein the amount of thermoplastic polyester in the composition is between 5 wt % and 50 wt %, and
wherein the amount of the at least one or more elastomers in the composition is between 1 wt % and 35 wt %.

2. The floor panel according to claim 1, wherein the thermoplastic polyester is polyethylene terephthalate (PET).

3. The floor panel according to claim 2, wherein the thermoplastic polyester is present in the composition in the form of PET flakes.

4. The floor panel according to claim 1, wherein the at least one of the elastomers has a Shore hardness which is higher than 20 Shore A and is lower than 90 Shore A, wherein the Shore hardness is measured according to the ISO 868 standard.

5. The floor panel according to claim 1, wherein at least one of the elastomers is a thermoplastic elastomer.

6. The floor panel according to claim 1, wherein the at least one of the elastomers is a polyolefin elastomer (POE).

7. The floor panel according to claim 1, wherein the composition also comprises at least mineral fiber structures, wherein the amount in the composition is between 5 wt % and 40 wt %.

8. The floor panel according to claim 1, wherein the composition also comprises at least a compatibilizer or a coupling agent, wherein the compatibilizer or coupling agent is selected from at least one of a copolymer of ethylene and glycidyl methacrylate, a terpolymer of ethylene, acryl ester and glycidyl methacrylate, and a polypropylene grafted with maleic anhydride.

9. The floor panel according to claim 1, wherein the composition also comprises at least melt enhancers, the amount of which in the composition is smaller than 5 wt %.

10. The floor panel according to claim 1, wherein the composition also comprises at least a thermoplastic synthetic material other than thermoplastic polyester, which is a polypropylene or polystyrene or a combination of both.

11. The floor panel according to claim 1, wherein the decorative top layer comprises a decor, as well as a transparent or translucent wear layer situated above the decor.

12. The floor panel according to claim 1, wherein the floor panel also comprises a counter layer situated underneath the substrate.

13. The floor panel according to claim 1, wherein the floor panel, on at least two opposite edges, is provided with mechanical coupling means or coupling parts, wherein these coupling means or coupling parts allow that two of such floor panels can be coupled to each other in such a manner that a locking is created in a direction perpendicular to the plane of the coupled floor panels, as well as in a direction perpendicular to the coupled edges and in the plane of the coupled floor panels.

14. A floor panel for forming a floor covering, wherein the floor panel comprises:
a layer-shaped substrate,
a decorative top layer situated above the substrate; and
wherein the substrate comprises at least a layer which is realized on the basis of a composition comprising at least a thermoplastic synthetic material and at least one or more elastomers;
wherein said thermoplastic synthetic material is a thermoplastic polyester; and
wherein the at least one of the elastomers is realized on the basis of propylene; and
wherein the elastomer realized on the basis of propylene has at least one of the following characteristics:
is an ethylene-propylene copolymer; or
is a thermoplastic olefin (TPO) or a composition of polypropylene and not-cross-linked ethylene-propylene-diene monomer (EPDM) rubber,
wherein the composition also comprises at least a filler, said filler comprising chalk, limestone and/or talc, wherein the amount thereof in the composition is between 10 wt % and 80 wt %.

15. The floor panel according to claim 8, wherein the amount of compatibilizer or coupling agent in the composition is smaller than 10 wt %.

16. A floor panel for forming a floor covering, wherein the floor panel comprises:
a layer-shaped substrate,
a decorative top layer situated above the substrate; and
wherein the substrate comprises at least a layer which is realized on the basis of a composition comprising at least a thermoplastic synthetic material and at least one or more elastomers;
wherein said thermoplastic synthetic material is a thermoplastic polyester,
wherein the at least one of the elastomers is realized on the basis of a styrene block copolymer, and
wherein the elastomer realized on the basis of styrene block copolymer has at least one of the following characteristics:
is a block copolymer based on styrene and ethylene/butylene or styrene and ethylene/propylene; or
it is realized on the basis of a composition of SEBS or SBS and, a polyolefin,
wherein the amount of thermoplastic polyester in the composition is between 5 wt % and 50 wt %, and
wherein the amount of at least one or more elastomers in the composition is between 1 wt % and 35 wt %.

17. The floor panel according to claim 16, wherein the composition also comprises at least a filler, said filler comprising chalk, limestone and/or talc, wherein the amount thereof in the composition is between 10 wt % and 80 wt %.

18. The floor panel according to claim 16, wherein at least one of the elastomers is a thermoplastic elastomer.

* * * * *